Dec. 22, 1959 M. H. JOHNSON Re. 24,757

SIDE LOADER FOR VEHICLES

Original Filed Oct. 7, 1952 2 Sheets-Sheet 1

Martin H. Johnson
INVENTOR.

BY Clarence A. O'Brien and Harvey B. Jacobson
Attorneys

Dec. 22, 1959 M. H. JOHNSON Re. 24,757

SIDE LOADER FOR VEHICLES

Original Filed Oct. 7, 1952 2 Sheets-Sheet 2

Martin H. Johnson

INVENTOR.

BY Thomas A. O'Brien and Harvey R. Jacobson

Attorneys

United States Patent Office

Re. 24,757
Reissued Dec. 22, 1959

24,757

SIDE LOADER FOR VEHICLES

Martin H. Johnson, Stoughton, Wis., assignor to Stoughton Cab & Body Company, Stoughton, Wis., a corporation of Wisconsin Original No. 2,751,099, dated June 19, 1956, Serial No. 313,401, October 7, 1952. Application for reissue September 27, 1957, Serial No. 687,338

4 Claims. (Cl. 214—83.24)

Matter enclosed in heavy brackets [ ] appears in the original patent but forms no part of this reissue specification; matter printed in italics indicates the additions made by reissue.

This invention relates in general to loading means for truck bodies which facilitates the movement of packages to be carried in a truck body to a point remote from a doorway thereof.

The primary object of this invention is to provide an improved loading mechanism which may be utilized for movement of merchandise from a point adjacent a doorway of a truck body to an opposite wall thereof, whereby the truck may be conveniently loaded by a workman standing adjacent a doorway of the truck body on the exterior thereof.

Another object of this invention is to provide an improved carriage mounted within a truck body for movement from a point adjacent a doorway thereof to a point adjacent an opposite wall of the truck body, said carriage being adapted to have disposed therein merchandise being loaded into the truck in order that the truck may be loaded by workmen from outside of the same.

A further object of this invention is to provide an improved side loader for use in heavily refrigerated bodies where compartments and doors are small so that the operator does not enter the truck, said loader permitting the elimination of street-side doors whereby the truck may be loaded and unloaded completely from the sidewalk side of the truck body and thereby greatly reducing the possibility of the operator of the truck being struck by other vehicles.

A still further object of this invention is to provide an improved side loader for vehicle bodies, said side loader including a carriage movable within said body transversely thereof, said carriage being aligned with a doorway of the body and being provided with guide means for moving the same toward and away from the doorway, said guide means being operable from a position exteriorly of the body.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 6:
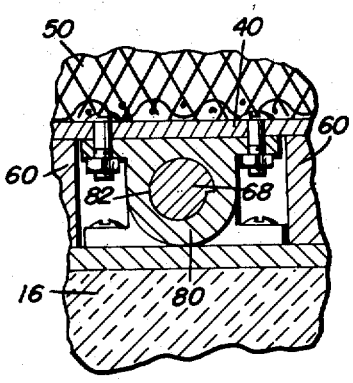
Figure 2:
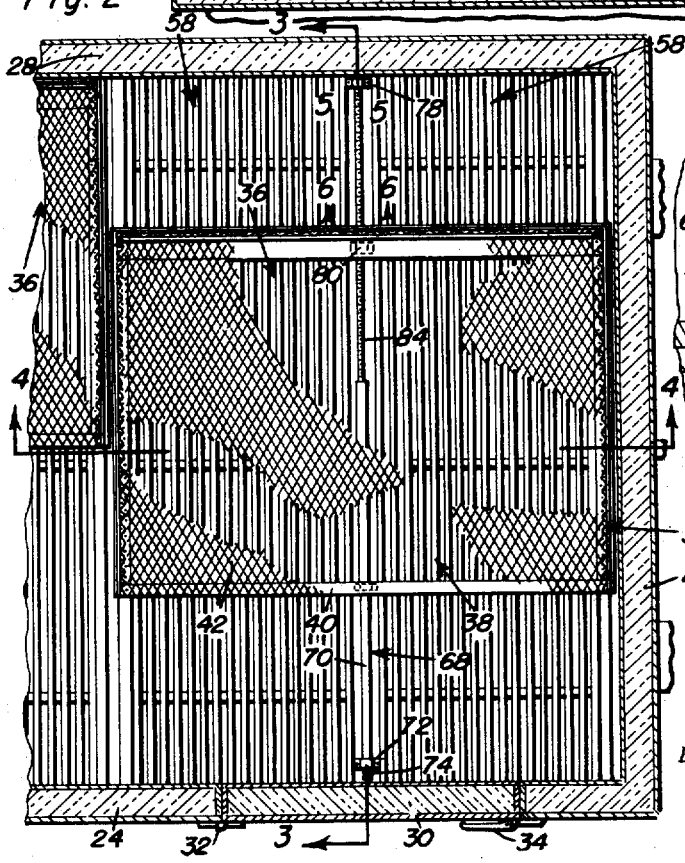
Figure 2 is an enlarged fragmentary transverse horizontal sectional view taken through the upper portion of the truck body of Figure 1 and shows the specific construction of the interior thereof.
Figure 5:
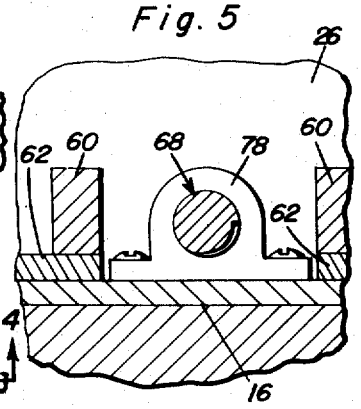

Figure 5 is an enlarged fragmentary transverse vertical sectional view taken substantially upon the plane indicated by the section line 5—5 of Figure 2 and shows the manner in which a drive shaft is mounted within the truck body for actuating one of the carriages; and, Figure 6 is an enlarged fragmentary transverse vertical sectional view taken substantially upon the plane indicated by the section line 6—6 of Figure 2 and shows the construction of a nut member mounted on the drive shaft for imparting movement to one of the carriages in response to rotation of the drive shaft.

Similar characters of reference designate similar or identical elements and portions throughout the specification and throughout the different views of the drawings.

Referring now to the drawings in detail, it will be seen that there is illustrated a refrigerator truck which is referred to in general by the reference numeral 10. The refrigerator truck 10 includes generally a cab which is referred to in general by the reference numeral 12 and a refrigerator body which is referred to in general by the reference numeral 14. The refrigerator body 14 includes a bottom wall 16 which is mounted on a frame 18 of the truck 10 and has extending upwardly at the edges thereof a front wall 20, a rear wall 22, a sidewalk side wall 24 and a street side wall 26. The refrigerator body 14 also includes a top wall 28 which is in spaced parallel relation to the bottom wall 16.

The sidewalk side wall 24 of the refrigerator body 14 is provided with a pair of spaced doors 30 which are hingedly connected to the side wall 24 by hinges 32 and are retained in closed positions by latch structures 34. It will be understood that when the doors 30 are closed that they are in tight sealing relation with the surrounding portion of the sidewalk side wall 24. The walls of the refrigerator body 14 may be of any type insulated construction.

Figure 1:
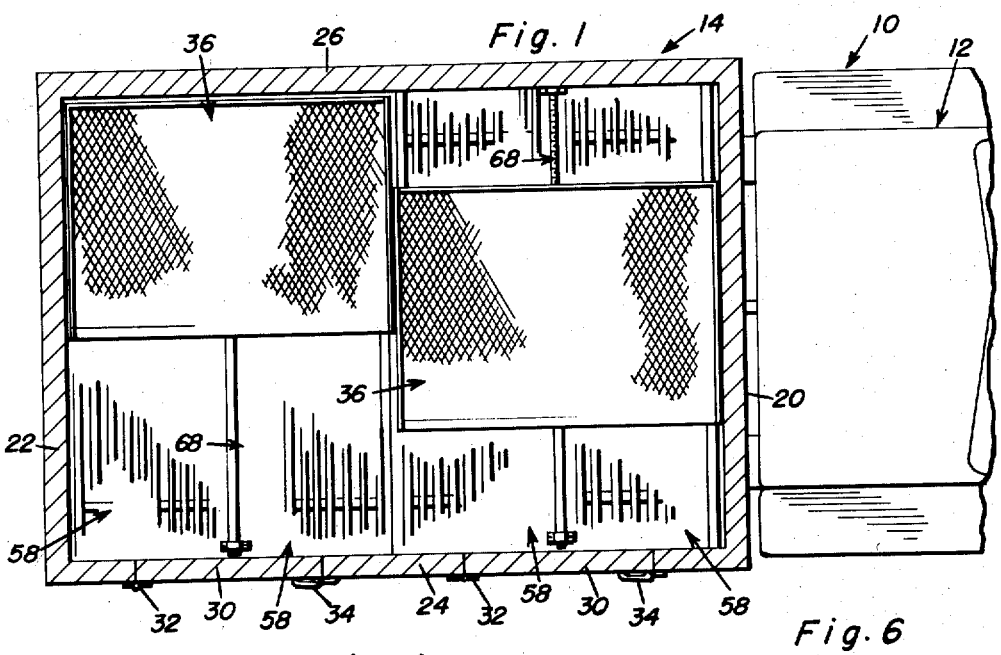
Figure 1 is a fragmentary top plan view of a refrigerator truck, the top of the body portion of the truck being omitted and the walls thereof being shown in cross-section, said truck body being provided with the side loader mechanism which is the subject of this invention and shows the general relationship of a pair of carriages mounted therein.

Referring now to Figure 1 in particular, it will be seen that the refrigerator body 14 is substantially divided into two halves with each half being associated with one of the doors 30. Mounted in each half of the refrigerator body 14 is a movable carrier which is referred to in general by the reference numeral 36. Inasmuch as the movable carriages 36 are identical, only the forward carriage will be described in detail.

The carriage 36 includes a generally rectangular base which is referred to in general by the reference numeral 38. The base 38 includes a frame formed of a plurality of flat strips and referred to by the reference numeral 40. The frame 40 has secured thereto wire screening 42 which forms the bottom of the carriage 36.

The carriage 36 also includes a generally rectangular back which is referred to in general by the reference numeral 44. The back 44 includes a generally rectangular frame 46 which is formed of angle members and has a height substantially equal to the height of the refrigerator body 14. Extending transversely of the frame 46 in vertically spaced relation is a plurality of straps 48 to which is fastened a screen 50.

The carriage 36 is completed by a pair of generally trapezoidal sides which are referred to in general by the reference numeral 52. The sides are identical and each includes a framework 54 which has secured thereto wire screening 56 so as to enclose packages (not shown) mounted on the base 38.

Figure 4:
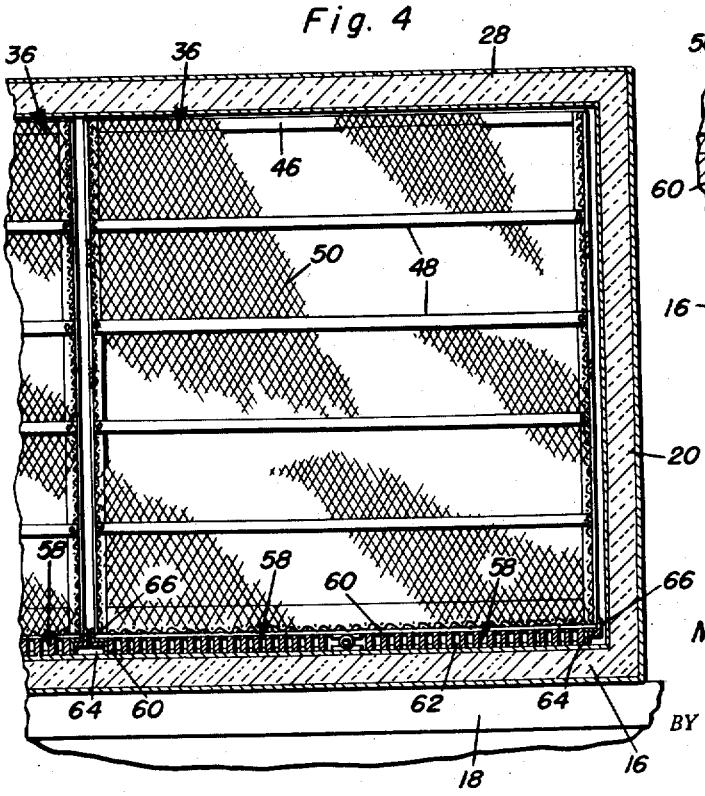
Figure 4 is a fragmentary transverse vertical sectional view taken substantially upon the plane indicated by the section line 4—4 of Figure 2 and showing generally the construction of one of the carriages and its relationship to a slotted floor of the truck body.
Figure 3:
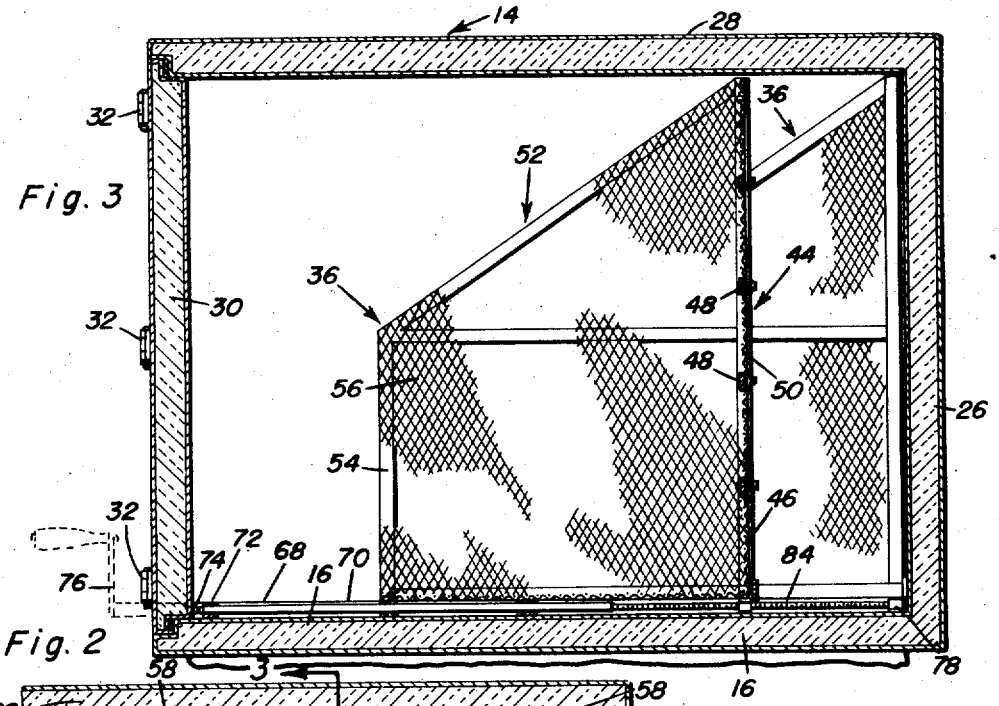
Figure 3 is a transverse vertical sectional view taken substantially upon the plane indicated by the section line 3—3 of Figure 2 and shows the general outline of a carrier mounted within the truck body, a removable crank for actuating said carrier being illustrated in dotted lines.

Referring now to Figure 4 in particular, it will be seen that the refrigerator body 14 is provided with a removable slatted floor which is in the form of floor panels 58. Each of the floor panels 58 includes a plurality of elongated spaced parallel slats 60 which are disposed on edges thereof and secured together by transversely extending flat strips 62.

It will be understood that each half of the refrigerator body 14 includes a pair of said floor panels 58 and that the opposed edges of the floor panels 58 of each half of the refrigerator body are in spaced parallel relation. The frame 40 of the base 38 of the carrier 36 is carried by the floor panels 58 and slide thereover. In order that the movement of the carriage 36 may be guided, the outermost slats 60 of each of the floor panels 58 are provided with a generally L-shaped guide rail 64 which has an upper flange disposed horizontally. Carried by the side edges of the base 38 and secured to the frame 40 thereof are similar guide members 66 which are angular in cross-section and have lower horizontal flanges. The lower horizontal flanges of the guide members 66 are positioned beneath the upper horizontal flanges of the guide rails 64 and prevent both transverse movement of the carriage 36 with respect to the guide rails 64 and vertical movement of the carriage.

In order that the carriage 36 may be moved towards and away from its respective door 30, there is provided a drive shaft, which is referred to in general by the reference numeral 68, positioned between the opposed edges of the floor panels 58 and carried by the bottom wall 16 of the refrigerator body 14. The drive shaft 68 includes an outer end portion 70 which is plain and has the outer end thereof mounted in a thrust bearing 72 carried by the bottom wall 16 adjacent the doorway for the respective door 30. The extreme outer end of the drive shaft 68 is in the form of a polygonal cross-sectional end 74 of reduced cross-section with said end portion being adapted to have removably connected thereto a crank 76. The inner end of the drive shaft 68 is also plain and is mounted in an inner thrust bearing 78 carried by the bottom wall 16 in alignment with the thrust bearing 74.

Referring now to Figure 6 in particular, it will be seen that secured to the rear of the frame 40 of the base 38 and depending downwardly therefrom is a nut member 80. The nut member 80 is provided with an internally threaded bore 82 in which is threadedly received a threaded intermediate portion 84 of the drive shaft 68. Inasmuch as the nut member 80 is not permitted to rotate in response to rotation of the drive shaft 68, it will be seen that when the drive shaft 68 is rotated by utilizing the crank 76 that the carriage 36 is moved transversely of the refrigerator body 14.

When it is desired to load the refrigerator body 14, the drive shaft 68 is rotated until the carriage 36 is moved to a position adjacent its associated door 30. The carriage 36 is then loaded with the packages desired to be transported in the refrigerator body 14. After the carriage 36 has been filled with packages, the crank 76 is rotated in an opposite direction in order to move the carriage 36 towards the street side wall 26. The crank 76 is rotated until the back 44 of the carriage is in engagement with the inner surface of the street side wall 26. After the carriage 36 has been so positioned, the portion of the refrigerator body 14 between the carriage 36 and its associated door 30 is also loaded with packages.

It will be seen that inasmuch as the refrigerator body 14 may be loaded from one side through the doors 30 by utilizing the carriage 36 the possibility of an operator of the truck 10 being struck by vehicles when unloading the truck is greatly reduced. Also, by utilizing the carriage 36 the entire bulk of the merchandise carried by the carriage may be moved towards the respective door 30 upon unloading of the merchandise positioned between the carriage and the door. The movement of the carriage 36 prevents the accidental shifting of the load of a partially loaded truck.

It will be understood that the number of carriages 36 disposed in the truck body 14 may vary according to the size of the truck body and the type of merchandise being carried thereby. However, it will be understood that there will be provided a door 30 for each of the carriages 36 and that the carriages 36 may be independently operated in order that the loading and unloading of the truck 10 may be varied as desired.

The operation of this device will be understood from the foregoing description of the details thereof, taken in conjunction with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having thus described the invention, what is claimed as new is:

1. In a refrigerator delivery body, means for loading the body from openings in a side thereof, said means including a movable carrier aligned with each of said openings and movable towards and away from an associated opening, said carrier having a dimension in the direction of its movement equal to substantially one-half the width of said body, said delivery body including a slatted rack floor, said carrier having a base portion slidably positioned on said flor, individual slats of said floor extending in the general direction of the movement of said carrier, drive means for said carrier positioned between adjacent centrally located slats of said floor.

2. In a refrigerator delivery body, means for loading the body from openings in a side wall thereof, said means including a movable carrier aligned with each of said openings and movable towards and away from an associated opening, said delivery body including a slatted rack floor, said carrier having a base portion slidably positioned on said floor, individual slats of said floor extending in the general direction of the movement of said carrier, [said drive means] *drive means for said carrier* including a drive shaft mounted in bearings, said bearings being carried by a bottom wall of said delivery body, said floor resting on said bottom wall, said drive shaft being threaded, a nut mounted on said drive shaft, said nut being rigidly carried by said base portion, said drive shaft, bearings and nut being disposed within the confines of said floor between adjacent slats.

*3. In a refrigerator delivery body having an opening in a vertical wall thereof, means for loading the body including a movable carrier aligned with said opening and movable toward and away from it, said body including a slatted rack floor, said carrier having a base portion slidably positioned on said floor, individual slats of said floor extending in the general direction of the movement of said carrier, drive means for said carrier including a drive shaft mounted in bearings, said bearings being carried by a bottom wall of said delivery body, said floor resting on said bottom wall, said drive shaft being threaded, a nut mounted on said drive shaft, said nut being rigidly carried by said base portion, said drive shaft, bearings and nut being disposed within the confines of said floor between adjacent slats.*

*4. In a refrigerator delivery body having an opening in a vertical wall thereof, means for loading the body including a movable carrier aligned with said opening and movable toward and away from it, said body including a slatted rack floor, said carrier having a base portion slidably positioned on said floor, individual slats of said floor extending in the general direction of the movement of said carrier, drive means for said carrier including a horizontal drive shaft having a threaded portion and a smooth surfaced cylindrical portion, bearings mounting said shaft*

*on the bottom wall of said delivery body, said floor slats resting on said bottom wall and having their top surfaces in a horizontal plane above the drive shaft, a nut secured to the base portion of the carrier at one end of said carrier and threading on the threaded portion of said shaft, said carrier having means on the other end of its base portion guided on the smooth cylindrical portion of said shaft, said shaft, bearings, nut and guide means being disposed within the confines of said floor between adjacent slats.*

References Cited in the file of this patent or the original patent

UNITED STATES PATENTS

| | | |
|---|---|---|
| 683,662 | Rankin | Oct. 1, 1901 |
| 1,050,973 | Meyer | Jan. 21, 1913 |
| 1,088,104 | Sharp | Feb. 24, 1914 |
| 1,288,175 | Pittman | Dec. 17, 1918 |
| 1,375,535 | Ortgier | Apr. 19, 1921 |
| 1,586,485 | Swanson et al. | May 25, 1926 |
| 2,091,070 | Girl | Aug. 24, 1937 |
| 2,168,018 | Hartz | Aug. 1, 1939 |
| 2,210,975 | Gilmore | Aug. 13, 1940 |
| 2,264,157 | Baker et al. | Nov. 25, 1941 |
| 2,295,934 | Clark | Sept. 15, 1942 |
| 2,454,566 | Pfeiffer | Nov. 23, 1948 |
| 2,553,156 | Woodward | May 15, 1951 |
| 2,569,161 | Golay | Sept. 25, 1951 |
| 2,605,064 | Davis | July 29, 1952 |
| 2,625,118 | Lechner | Jan. 13, 1953 |
| 2,657,088 | Clement | Oct. 27, 1953 |